United States Patent
Netzler et al.

(10) Patent No.: US 12,340,684 B2
(45) Date of Patent: Jun. 24, 2025

(54) FLIGHT ATTENDANT CALLING DEVICE, SYSTEM AND METHOD FOR CONFIGURING A FLIGHT ATTENDANT CALLING DEVICE

(71) Applicant: Airbus Operations GmbH, Hamburg (DE)

(72) Inventors: Michael Netzler, Hamburg (DE); Michael Lüdtke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 121 days.

(21) Appl. No.: 17/847,501

(22) Filed: Jun. 23, 2022

(65) Prior Publication Data
US 2022/0415162 A1  Dec. 29, 2022

(30) Foreign Application Priority Data

Jun. 25, 2021  (EP) .................................... 21181768

(51) Int. Cl.
| | |
|---|---|
| *G08C 17/02* | (2006.01) |
| *G06N 20/00* | (2019.01) |
| *G08B 5/00* | (2006.01) |
| *G08B 6/00* | (2006.01) |

(52) U.S. Cl.
CPC ............... *G08C 17/02* (2013.01); *G08B 5/00* (2013.01); *G08B 6/00* (2013.01); *G06N 20/00* (2019.01); *G08C 2201/34* (2013.01)

(58) Field of Classification Search
CPC .................................................. G08C 17/02
See application file for complete search history.

(56) References Cited

U.S. PATENT DOCUMENTS

| | | | |
|---|---|---|---|
| 9,245,303 B2 | 1/2016 | Ogilvie | |
| 2005/0159151 A1* | 7/2005 | Eckelt | B64D 11/0624 455/431 |
| 2009/0172146 A1* | 7/2009 | Bates | G06F 16/636 709/224 |
| 2010/0060739 A1* | 3/2010 | Salazar | B64D 11/00153 348/E5.061 |
| 2010/0217458 A1* | 8/2010 | Schweiger | G06F 16/29 715/728 |

(Continued)

OTHER PUBLICATIONS

European Search Report; priority document.

*Primary Examiner* — Joseph H Feild
*Assistant Examiner* — Pameshanand Mahase
(74) *Attorney, Agent, or Firm* — Greer, Burns & Crain, Ltd.

(57) ABSTRACT

A flight attendant calling device of a passenger aircraft includes at least one calling device control element assigned to a seat of the passenger aircraft for calling flight attendant staff on board the passenger aircraft by a passenger assigned to the seat, a calling device processor configured to create a configuration profile of the at least one calling device control element based on passenger preferences of the passenger of the passenger aircraft assigned to the seat, and a control element configurator, which is coupled to the calling device processor, and which is configured to set up a visual and/or haptic appearance as well as a flight attendant calling functionality of the at least one calling device control element based on the configuration profile received from the calling device processor.

11 Claims, 1 Drawing Sheet

(56) References Cited

U.S. PATENT DOCUMENTS

| | | | |
|---|---|---|---|
| 2021/0061471 A1* | 3/2021 | Bates | G06Q 30/0255 |
| 2021/0122469 A1* | 4/2021 | Wu | B64D 11/00154 |
| 2022/0407936 A1* | 12/2022 | Ranjan | G06F 16/955 |

* cited by examiner

FLIGHT ATTENDANT CALLING DEVICE, SYSTEM AND METHOD FOR CONFIGURING A FLIGHT ATTENDANT CALLING DEVICE

CROSS-REFERENCES TO RELATED APPLICATIONS

This application claims the benefit of the European patent application No. 21181768.9 filed on Jun. 25, 2021, the entire disclosures of which are incorporated herein by way of reference.

FIELD OF THE INVENTION

The invention relates to a flight attendant calling device for use in passenger cabins of passenger aircraft, as well as a system and a method for configuring a flight attendant calling device.

BACKGROUND OF THE INVENTION

Passenger service units (PSUs) on board passenger aircraft often include push buttons or other static controls assigned to a specific passenger seat which are used to enable a passenger to send a calling signal to a member of the aircraft crew, so-called flight attendant calling devices. Such calling signals only provide the crew members with information about the location of the assigned passenger seat, but not about the respective desire of the passenger. Flight attendants can go to the passenger seat after receiving the calling signal, question the passenger about his wishes and then act accordingly, such as fetching a pillow, serving a drink, or initiating a purchase process from the on-board shop.

The publication US 2021/0061471 A1 discloses a method and system for predictive preference selection for on-board entertainment systems in passenger aircraft. The publication U.S. Pat. No. 9,245,303 B2 discloses configurable on-board entertainment systems in passenger aircraft.

SUMMARY OF THE INVENTION

One of the objects of the invention is to find solutions for flight attendant calling systems in which it is possible to differentiate more flexibly and efficiently depending on passengers.

According to a first aspect of the invention, a flight attendant calling device of a passenger aircraft comprises at least one calling device control element assigned to a seat of the passenger aircraft for calling flight attendant staff on board the passenger aircraft by a passenger assigned to the seat, a calling device processor, which is designed to provide a configuration profile of at least one calling device control element based on passenger preferences of the passenger of the passenger aircraft assigned to the seat, and a control element configurator which is coupled to the calling device processor and which is designed to set up a visual and/or haptic appearance and a flight attendant calling functionality of the at least one calling device control element on the basis of the configuration profile received from the calling device processor.

According to a second aspect of the invention, a system comprises at least one flight attendant calling device according to the first aspect of the invention, as well as an aircraft network with an aircraft server, a data memory coupled to the aircraft server, and an aircraft communication module, wherein the aircraft server is designed to store a plurality of passenger preference profiles in the data memory, and a ground-based airline network with an airline server, at least one data memory coupled to the airline server, and a ground communication module, wherein the airline server is designed to create the plurality of passenger preference profiles based on passenger preferences of a plurality of passengers and transmit them to the aircraft server via a data link between the ground communication module and the aircraft communication module.

According to a third aspect of the invention, a method for configuring a flight attendant calling device in a passenger aircraft includes the steps of creating, by means of an airline server of a ground-based airline network, a plurality of passenger preference profiles for a plurality of passengers based on passenger preferences of the respective passengers, transmitting the plurality of passenger preference profiles by means of the airline server to an aircraft server of an aircraft network, creating, by means of a calling device processor of a flight attendant calling device assigned to a seat of the passenger aircraft, a configuration profile of a calling device control element of the flight attendant calling device based on a passenger preference profile assigned to the seat of the passenger aircraft, and configuring a visual and/or haptic appearance as well as a flight attendant calling functionality of the calling device control element based on the configuration profile created by the calling device processor.

An essential idea of the invention is to be able to dynamically configure a flight attendant calling device depending on the passenger and his or her personal preferences before the start of the flight in order to enable the passenger to transmit targeted and demand-oriented wishes to the flight attendants on board the aircraft. The handling of the flight attendant calling device should be as intuitive as possible for the passenger, which is why an anonymized and, at the explicit request of the passenger, also personalized interaction history is used, so that control elements for a passenger are based on a software-supported evaluation by means of self-learning algorithms.

Advantageously, such flight attendant calling devices can be used in a passenger cabin of a passenger aircraft in order to be able to flexibly individualize the service conditions for each individual passenger.

According to some embodiments of the flight attendant calling device according to the invention and the system according to the invention, the at least one calling device control element may have a knob, a rotary knob, a switch, a button, a sensor surface, or a proximity sensor. The at least one calling device control element in some variants may be part of a passenger service unit of the flight attendant calling device.

According to some alternative embodiments of the flight attendant calling device according to the invention and the system according to the invention, the at least one calling device control element may have a control button of a graphical user interface of a display. The at least one calling device control element in some variants may be a software module of an onboard entertainment terminal of the passenger aircraft.

According to some further embodiments of the flight attendant calling device according to the invention and the system according to the invention, the calling device processor may further be designed to track operating processes of the at least one calling device control element by the passenger assigned to the seat and to forward these to an aircraft server of the passenger aircraft for creating a passenger preference profile.

According to some embodiments of the system according to the invention, the airline server may further be designed to create the plurality of passenger preference profiles using self-learning algorithms based on probable passenger preferences which are based on passenger preferences of past flights of the respective passengers. In some of these embodiments, the airline server may also be designed to additionally create the plurality of passenger preference profiles on the basis of information stored in the at least one data memory coupled to the airline server about flight routes, weather conditions, seasons, travel purposes, health information, current news, service availability, goods availability and/or personality information of the passengers.

According to some embodiments of the system according to the invention, the aircraft network may further have a cabin network access point, via which passengers can connect mobile devices to a cabin network. In some variants, the aircraft server may also be designed to transmit a control signal to the mobile devices to display a control element adapted to the respective instance of the plurality of passenger preference profiles by means of a graphical user interface of the mobile device.

According to some embodiments of the method according to the invention, the creation of the plurality of passenger preference profiles can be carried out using self-learning algorithms based on probable passenger preferences which are based on passenger preferences of past flights of the respective passengers. In some variants, the creation of the plurality of passenger preference profiles may also take place on the basis of information about flight routes, weather conditions, seasons, travel purposes, health information, current news, service availability, goods availability and/or personality information of the passengers.

The above designs and developments can be combined with each other as desired if this makes sense. Further possible embodiments, developments and implementations of the invention also include not explicitly mentioned combinations of features of the invention described above or below with regard to the exemplary embodiments. In particular, the person skilled in the art will also add individual aspects as improvements or additions to the respective basic form of the present invention.

BRIEF DESCRIPTION OF THE DRAWINGS

The present invention is explained in more detail below on the basis of the exemplary embodiments given in the schematic figures. In the figures.

Figure 1:
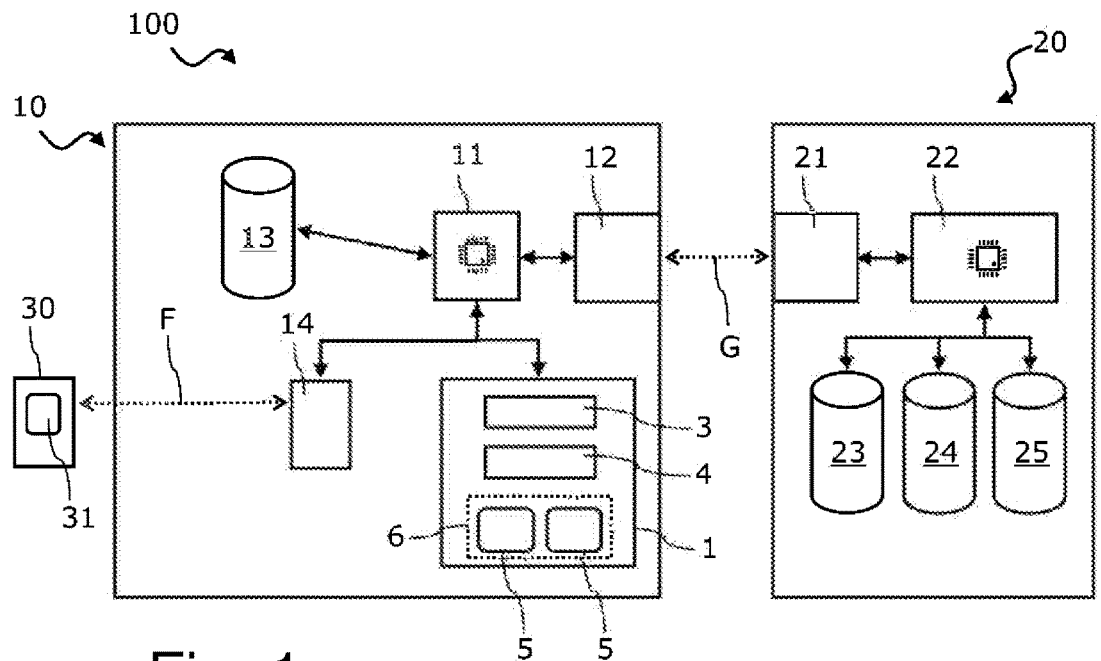
FIG. 1 shows a schematic block diagram of a system for configuring a flight attendant calling device for a passenger aircraft according to an embodiment of the invention.

The accompanying figures are intended to provide a further understanding of the embodiments of the invention. They illustrate embodiments and are used in combination with the description of the explanation of principles and concepts of the invention. Other embodiments and many of the advantages mentioned arise with regard to the drawings. The elements of the drawings are not necessarily shown to scale relative to each other. Directional terminology such as "top", "bottom", "left", "right", "above", "below", "horizontal", "vertical", "front", "back" and similar information is used for explanatory purposes only and does not serve to limit the generality to specific embodiments as shown in the figures.

In the figures of the drawing, identical, functionally identical, and identically acting elements, features, and components—unless otherwise stated—are each provided with the same reference characters.

DETAILED DESCRIPTION OF THE PREFERRED EMBODIMENTS

The following description refers to self-learning algorithms which are used in an artificial intelligence (AI) system. Generally speaking, a self-learning algorithm replicates cognitive functions that are assigned to human thinking according to human judgement. By adding new training information, the self-learning algorithm can dynamically adapt the knowledge gained from old training information to the changed circumstances in order to recognize and extrapolate patterns and laws in the entirety of the training information.

In self-learning algorithms within the meaning of the present invention, all types of training forming human knowledge acquisition can be used, such as supervised learning, partially supervised learning, independent learning on the basis of generative, non-generative or deeply adversarial networks (AN), reinforcement learning, or active learning. Feature-based learning ("representation learning") can be used in each instance. The self-learning algorithms within the meaning of the present invention can in particular make an iterative adjustment of parameters and features to be learned by means of feedback analysis.

A self-learning algorithm for the purposes of the present invention may be based on a support vector network (SVN), a neural network such as a convolutional neural network (CNN), a Kohonen network, a recurrent neural network, a time-delayed neural network (TDNN) or an oscillatory neural network (ONN), a random forest classifier, a decision tree classifier, a Monte Carlo network, or a Bayesian classifier. A self-learning algorithm within the meaning of the present invention can use property inheritance algorithms, k-means algorithms such as Lloyd or MacQueen's algorithms or TD learning algorithms such as SARSA or Q-Learning.

FIG. 1 shows a schematic block diagram of a system 100 for configuring a flight attendant calling device 1 for a passenger aircraft. In particular, the system can be used in connection with the passenger aircraft A schematically illustrated in FIG. 2.

Figure 2:
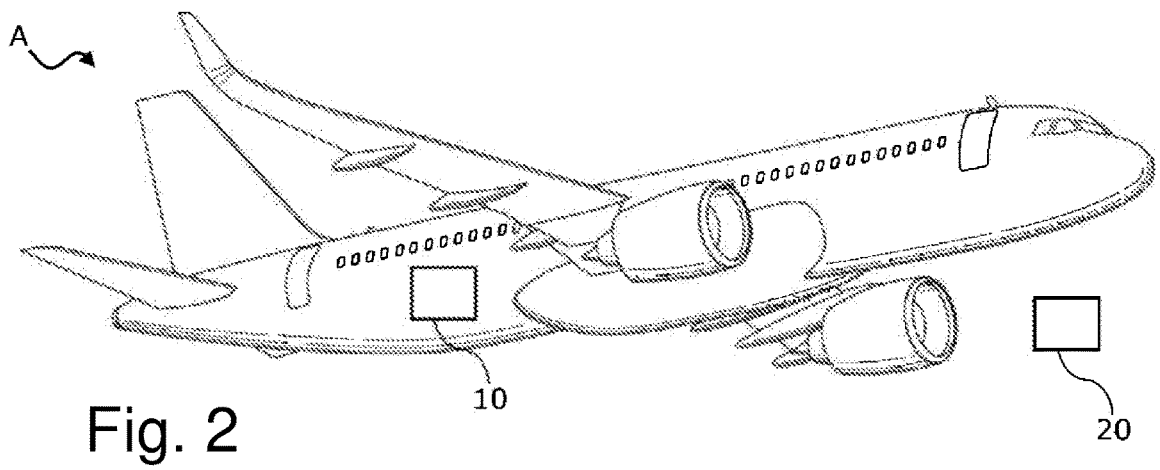
FIG. 2 shows a schematic illustration of an aircraft with a configurable flight attendant calling device according to a further embodiment of the invention.

The system 100 has an integrated part in an aircraft—such as aircraft A of FIG. 2—with an aircraft network 10 and an externally housed part—such as in the operating premises of an airline—with a ground-based airline network 20. The aircraft network 10 has an aircraft server 11, a data memory 13 coupled to the aircraft server 11, and an aircraft communication module 12. The ground-based airline network 20 comprises an airline server 22, multiple data memories 23, 24 or 25 coupled to the airline server 22 for different data sources and a ground communication module 21. By means of the ground communication module 21 and the aircraft communication module 12, a communication link G can be maintained between the ground-based airline network 20 and the aircraft network 10, by means of which data can be exchanged between the two networks 10 and 20. The communication modules 21 and 12 can be, for example, radio communication modules or wired communication modules such as USB interfaces.

The aircraft A contains one or more flight attendant calling devices 1. Such flight attendant calling devices 1 may, for example, have a passenger service unit 6. However, it may also be possible that the flight attendant calling devices 1 are onboard entertainment terminals 6 on board the aircraft A. The flight attendant calling devices 1 each have at least one calling device control element 5 assigned to a seat of the passenger aircraft A for calling flight attendant staff on board the passenger aircraft A. The calling device control elements 5 can be designed, for example, in a passenger service unit 6 as a knob, rotary knob, switch, button, sensor surface or proximity sensor. However, it may also be possible to design calling device control elements 5 as control buttons of a graphical user interface of a display of an on-board terminal device, such as a tablet or a backrest monitor with touch functionality.

A passenger booked in a seat for the duration of a flight can use the calling device control elements 5 to inform the flight attendant staff of a service request. The calling device control elements 5 are dynamically configurable in order to take into account the respective service preferences of the respective passenger during the duration of the flight.

For this purpose, the flight attendant calling device 1 has a calling device processor 3. The calling device processor 3 can create a configuration profile of the at least one calling device control element 5 based on passenger preferences of the passenger currently occupying the seat. For this purpose, the calling device processor 3 can receive a passenger preference profile from the profile memory 13 suitable for the passenger transmitted from the aircraft server 11.

The passenger preference profiles contain information about which service requests a passenger has predominantly expressed in the past under certain flight conditions and which service requests a passenger is likely to need for the current flight. The passenger preference profiles can be created in the ground-based airline network 20 by the airline server 22. In addition to historical passenger preferences on similar flights, the airline server 22 can access various data sources of external information. For example, the plurality of passenger preference profiles can be created based on information stored in different instances of the data memories 23, 24 or 25 about flight routes, weather conditions, seasons, travel purposes, health information, current news, service availability, goods availability and/or personality information of the passengers.

The airline server can use self-learning algorithms to create the plurality of passenger preference profiles in order to make predictions about probable passenger preferences based on passenger preferences of the respective passengers based on past flights and, if appropriate, taking into account other boundary conditions of the current flight. The calling device processor 3 of the flight attendant calling devices 1 can be used to track operating processes of the calling device control elements 5 passenger-specifically and in chronological sequence. The history of the operating processes of the calling device control elements 5 can then be forwarded to the aircraft server 11 and used when creating the passenger preference profile assigned to the passenger.

The configuration profile of the calling device processor 3 can be used in the flight attendant calling devices 1 by a downstream control element configurator 4 to set up a visual and/or haptic appearance as well as a flight attendant calling functionality of the at least one calling device control element 5 on the basis of the respective current configuration profile. For example, in the case of sensor surfaces, it may be possible to adjust a backlight of the sensor surface in color, symbolism and/or brightness to signal to the passenger which flight attendant calling functionality is currently assigned to an operation of the calling device control element 5.

For example, the control element configurator 4 can preset the request for a blanket or the ordering process of a specific product from the on-board shop on board the aircraft as the preferred service request shown in the configuration profile. For this purpose, the control element configurator 4 can link the display in a crew panel (not explicitly shown) of the preferred service request shown in the configuration profile with an operation of the calling device control element 5 on the respective assigned seat. In this way, the passenger can already express a service request that he probably prefers to the flight attendant staff by simply operating the calling device control element 5, without the need for a non-specific request signal to the crew, due to which a flight attendant would have to come to the passenger's seat to inquire about the specific service request. As a result, unnecessary distances travelled by the flight attendant staff can be avoided and passenger comfort can be increased.

As shown in FIG. 1, not only flight attendant calling devices 1 integrated in the aircraft can be used to configure control elements. It may also be possible that the aircraft network 10 has, for example, a wireless, radio-based cabin network access point 14, via which passengers can connect mobile devices 30 such as tablets, PDAs, notebooks, smartphones, or other personal electronic devices to a cabin network by means of a wireless connection F. The aircraft server 11 can determine passengers associated with mobile devices 30 according to the passenger preference profiles and can send control signals to the mobile devices 30 which enable suitable software on the mobile devices 30—such as an app of an airline—to display one or more control elements 31 adapted according to a respective passenger preference profile by means of a graphical user interface of the mobile device 30. By operating the control element 31 on the graphical user interface, the passenger can then transmit a service request signal via the radio connection to the cabin network access point 14 and subsequently to a crew panel.

Figure 3:
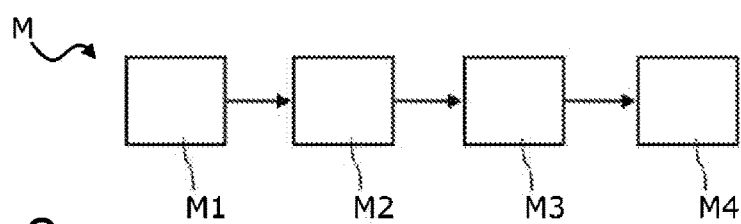
FIG. 3 shows a schematic flowchart of the steps of a method for configuring a flight attendant calling device for a passenger aircraft according to a further embodiment of the invention.

FIG. 3 shows a schematic flow diagram of procedural steps of a method M for configuring a flight attendant calling device 1 in a passenger aircraft. The method M can be used, for example, in a passenger aircraft A as shown in FIG. 2 by way of example. For this purpose, the method M can resort to the system 100 of FIG. 1 and its system components.

First, in step M1, an airline server 22 of a ground-based airline network 20 creates a plurality of passenger preference profiles for a plurality of passengers based on passenger preferences of each passenger. This creation can be done, for example, using self-learning algorithms based on probable passenger preferences which are based on passenger preferences of past flights of the respective passengers. In addition, information about flight routes, weather conditions, seasons, travel purposes, health information, current news, service availability, product availability and/or personal information of the passengers may be taken into account when creating passenger preference profiles.

In step M2, the passenger preference profiles are transmitted by the airline server 22 to an aircraft server 11 of an aircraft network 10, which can store the passenger preference profiles in a profile memory 13 on board an aircraft. By means of respective flight attendant calling devices 1, which are assigned to different seats of the passenger aircraft A, a plurality of configuration profiles of different calling device control elements 5 can be created in a calling device processor 3 in a step M3. These configuration profiles take into account the corresponding predicted or historical service request preferences of the passenger assigned to the respective seat for the current flight.

Using the configuration profiles, in step M4 the visual and/or haptic appearances as well as the associated flight attendant calling functionality of the different calling device control elements 5 can be configured on the basis of the respective passenger-related configuration profile. For example, knobs, rotary knobs, switches, buttons, sensor surfaces and/or proximity sensors can be provided with different service requests depending on the seat, so that a passenger can find at his assigned passenger service unit 6 suggestions tailored to him for specific service requests by simple operation of the configured calling device control element 5.

In the previous detailed description, various features have been summarized in one or more examples to improve the stringency of the representation. However, it should be clear that the above description is merely illustrative, but by no means restrictive. It is used to cover all alternatives, modifications and equivalents of the various features and exemplary embodiments. Many other examples will be immediately and directly clear in view of the above description to the person skilled in the art due to his professional knowledge.

The exemplary embodiments were selected and described in order to be able to present the principles underlying the invention and their possible applications in practice in the best possible way. As a result, experts can optimally modify and use the invention and its various embodiments with regard to the intended purpose. In the claims as well as the description, the terms "containing" and "having" are used as neutral language terms for the corresponding term "comprising". Furthermore, the use of the terms "a" and "an" should not in principle exclude a plurality of such described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight attendant calling device of a passenger aircraft, comprising:
   at least one calling device control element assigned to a seat of the passenger aircraft for calling attendant staff on board the passenger aircraft by a passenger assigned to the seat;
   a calling device processor, which is configured to create a configuration profile of the at least one calling device control element based on passenger preferences of the passenger of the passenger aircraft assigned to the seat; and
   a control element configurator, which is coupled to the calling device processor, and which is configured to set up at least one of a visual or haptic appearance, as well as a flight attendant calling functionality of the at least one calling device control element based on the configuration profile received from the calling device processor,
   wherein the calling device processor is further designed to track operating processes of the at least one calling device control element by the passenger assigned to the seat and to forward them to an aircraft server of the passenger aircraft for creation of a passenger preference profile,
   wherein the passenger preference profile is based on a combination of a passenger preference of the passenger assigned to the seat and on at least one of information not within the control of the passenger selected from the group consisting of a flight route, a weather condition, a season, a current news, a service availability, and goods availability.

2. The flight attendant calling device as claimed in claim 1,
   wherein the at least one calling device control element has a physical knob, a physical rotary knob, a physical switch, and a physical button, and
   wherein the at least one calling device control element is part of a passenger service unit of the flight attendant calling device.

3. The flight attendant calling device as claimed in claim 1,
   wherein the at least one calling device control element has a control button of a graphical user interface of a display, and
   wherein the at least one calling device control element is a software module of an onboard entertainment terminal of the passenger aircraft.

4. A system for configuring a flight attendant calling device, comprising:
   at least one flight attendant calling device as claimed in claim 1;
   an aircraft network with an aircraft server, a data memory coupled to the aircraft server, and an aircraft communication module,
   wherein the aircraft server is configured to store a plurality of passenger preference profiles in the data memory; and
   a ground-based airline network with an airline server, at least one data memory coupled to the airline server, and a ground communication module,
   wherein the airline server is configured to create the plurality of passenger preference profiles based on passenger preferences of a plurality of passengers and to transfer them to the aircraft server via a data connection between the ground communication module and the aircraft communication module.

5. The system as claimed in claim 4, wherein the airline server is further configured to create the plurality of passenger preference profiles using self-learning algorithms based on probable passenger preferences which are based on passenger preferences of past flights of the respective passengers.

6. The system as claimed in claim 5, wherein the airline server is further configured to additionally create the plurality of passenger preference profiles based on information about at least one of flight routes, weather conditions, seasons, travel purposes, health information, current news, service availability, goods availability or personal information of the passengers stored in the at least one data memory coupled to the airline server.

7. The system as claimed in claim 4,
wherein the aircraft network further has a cabin network access point via which passengers can connect mobile terminals to a cabin network, and
wherein the aircraft server is further configured to transfer a control signal to the mobile terminals to display a control element adapted according to a respective instance of the plurality of passenger preference profiles by means of a graphical user interface of the mobile terminal.

8. An aircraft with a flight attendant calling device as claimed in claim 1.

9. A method for configuring a flight attendant calling device in a passenger aircraft, including:
creating, by means of an airline server of a ground-based airline network, a plurality of passenger preference profiles for a plurality of passengers based on a combination of passenger preferences of the respective passengers and on at least one of information not within control of the passenger selected from the group consisting of flight routes, weather conditions, seasons, current news, service availability, and goods availability, wherein each passenger preference file is generated by tracking a use by each passenger of the flight attendant calling device on a prior flight;
transmitting the plurality of passenger preference profiles by the airline server to an aircraft server of an aircraft network;
creating, by means of a calling device processor of a flight attendant calling device assigned to a seat of the passenger aircraft, a configuration profile of a calling device control element of the flight attendant calling device based on a passenger preference profile assigned to the seat of the passenger aircraft; and
configuring at least one of a visual or haptic appearance and a flight attendant calling functionality of the calling device control element based on the configuration profile created by the calling device processor.

10. The method as claimed in claim 9,
wherein the at least one calling device control element has a knob, a rotary knob, a switch, a button, a sensor surface, or a proximity sensor, and
wherein the at least one calling device control element is part of a passenger service unit of the flight attendant calling device.

11. The method as claimed in claim 9, wherein creation of the plurality of passenger preference profiles is carried out using self-learning algorithms based on probable passenger preferences which are based on passenger preferences of past flights of the respective passengers.

\* \* \* \* \*